United States Patent [19]
Hogan

[11] Patent Number: 5,241,754
[45] Date of Patent: Sep. 7, 1993

[54] NAVIGATIONAL AID FOR USE WITH A MAP, CHART, OR THE LIKE

[76] Inventor: Joe R. Hogan, 8014 Bromley, Houston, Tex. 77055

[21] Appl. No.: 862,608

[22] Filed: Apr. 1, 1992

[51] Int. Cl.$^5$ .............................................. B43L 13/00
[52] U.S. Cl. ......................................... 33/457; 33/431; 33/454
[58] Field of Search ................. 33/456, 457, 459, 454, 33/431, 441

[56] References Cited

U.S. PATENT DOCUMENTS

| | | | |
|---|---|---|---|
| 298,471 | 5/1884 | Hutchinson | 33/431 |
| 682,452 | 9/1901 | Buhner | 33/454 |
| 746,494 | 12/1903 | Glaholm et al. | 33/454 |
| 986,358 | 3/1911 | Carmical | |
| 1,141,483 | 6/1915 | Pfeiffer | 33/454 |
| 1,673,836 | 6/1928 | Littlehales | |
| 1,746,537 | 2/1930 | Knechtel | 33/454 |
| 2,339,516 | 1/1944 | Quillen | |
| 3,187,434 | 6/1965 | Casagrande | |
| 3,377,706 | 4/1968 | Shrader | 33/431 |
| 3,673,690 | 7/1972 | DeBarros | 33/431 |

FOREIGN PATENT DOCUMENTS

| | | | |
|---|---|---|---|
| 0090399 | 4/1991 | Japan | 33/18.1 |
| 114595 | 7/1945 | Sweden | 33/454 |

Primary Examiner—William A. Cuchlinski, Jr.
Assistant Examiner—Alvin Wirthlin
Attorney, Agent, or Firm—Jack W. Hayden

[57] ABSTRACT

A pair of members (8) and (9) are joined by a pair of parallelograms (11) and (13) and when the members (8) and (9) are semi-circular in shape, they provide an apparatus and method whereby they may be positioned adjacent each other to form a circular member (C) and then stepwise moved toward and away from each other for use as a navigational aid. The members (8) and (9) may be in other shapes and may also be used to relocate various markings or designations on a map, chart and the like.

10 Claims, 3 Drawing Sheets

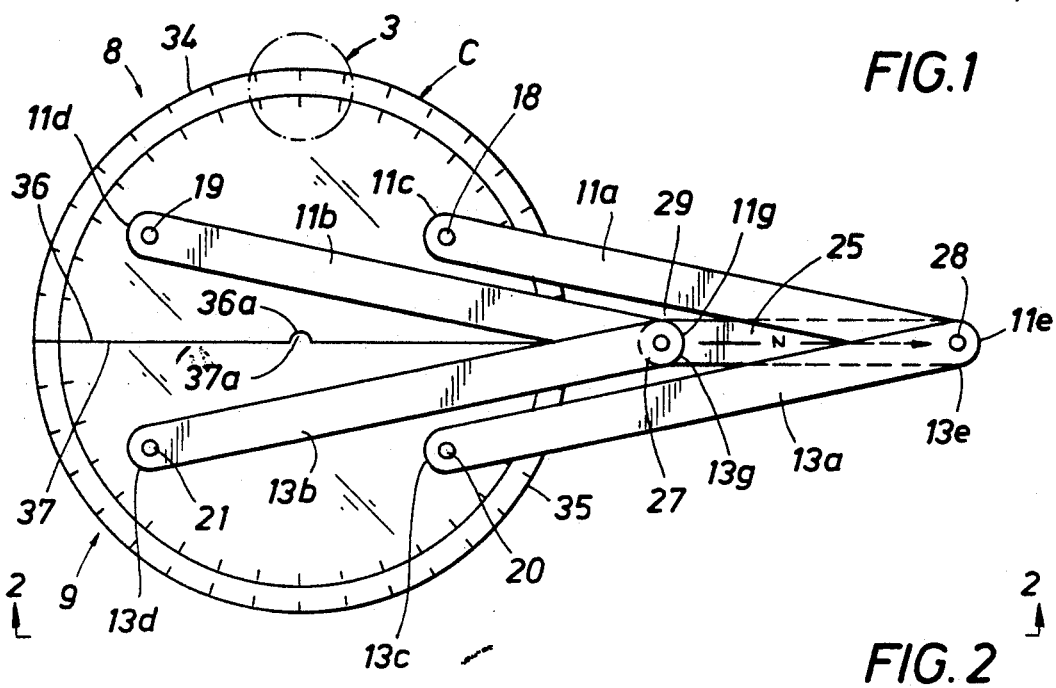
FIG.1
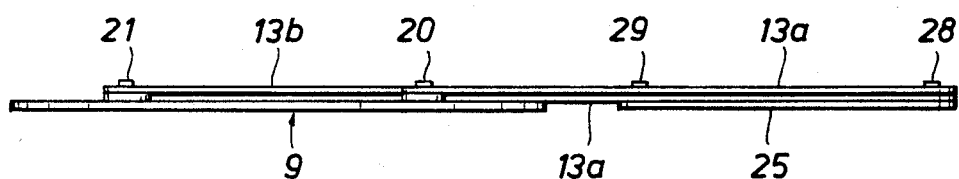
FIG.2
FIG.3
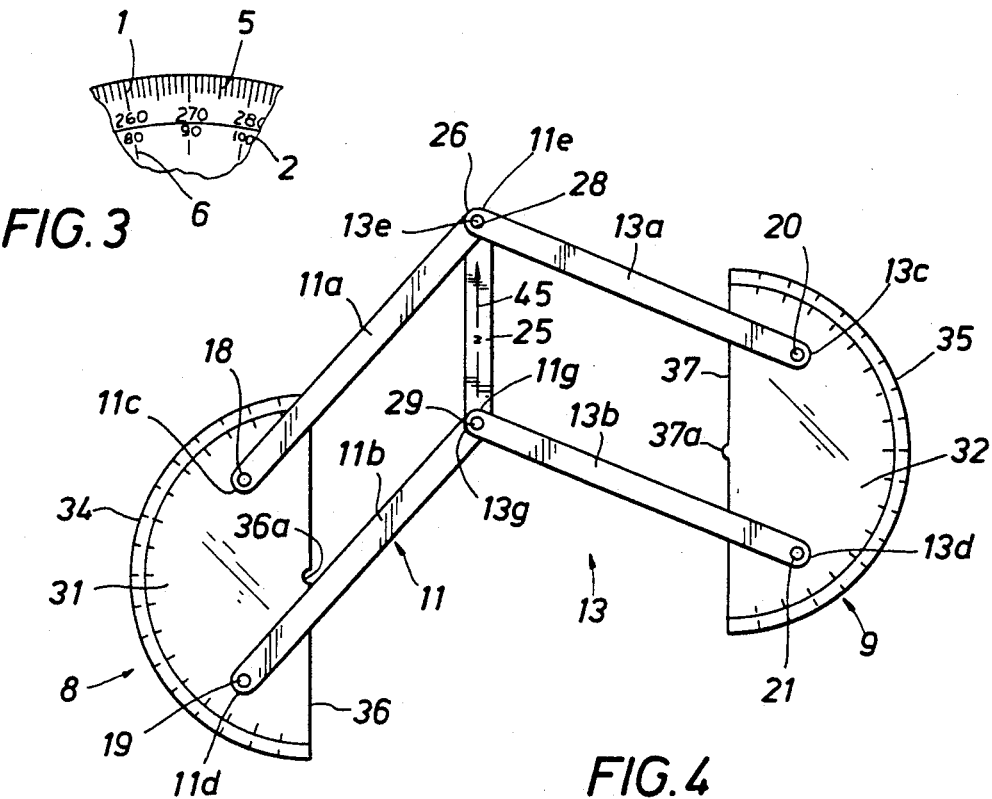
FIG.4

NAVIGATIONAL AID FOR USE WITH A MAP, CHART, OR THE LIKE

STATEMENT OF THE PRIOR ART

There are various devices for use with charts, maps and the like to plot a course or for other purposes, but applicant is not familiar with any prior art that discloses the structure, arrangement and advantages of the present invention.

SUMMARY OF THE INVENTION

Various devices have been proposed and are used as navigational aids to plot courses, or for other purposes in connection with a chart, map and the like.

However applicant is not familiar with any device which may be carried in a pocket for use with a map, chart and the like to plot courses relative to magnetic North, to relocate or generate a marking, such as a magnetic compass rose or the like on a map chart and the like while maintaining the same or original orientation of the marking on the map.

Nor is applicant familiar with a device of the type to which the present invention relates which employs two members of suitable configuration for use with a chart, map and the like with two parallelograms extending there between, with marking there on to represent magnetic North to enable the device to be "walked" along the map or chart in relation to magnetic North.

An object of the present invention is to provide a device of relatively simple construction which can be carried in a pocket as a navigational aid in various situations including aircraft, space flight, surface and marine.

Another object of the invention is to provide a device of relatively simple construction which can be carried in a pocket for transposing or shifting a marking on a chart, map and the like to another location or locations on the chart, map or the like while maintaining the original orientation of the marking on the map or chart.

Other objects and advantages of the present invention will become apparent from the following description and drawings.

BRIEF DESCRIPTION OF THE DRAWINGS

FIG. 1 is a top plan view of a preferred embodiment of the arrangement of the present invention illustrating the device in closed, or collapsed position;

FIG. 2 is a side view on the line 2—2 of FIG. 1;

FIG. 3 is a segmental plan view of a portion of FIG. 1 illustrating one form of indicia or marking that may be provided;

FIG. 4 is perspective view illustrating the device of the present invention with the two parallelograms partially opened and the two members between which the parallelograms extend separated.

DESCRIPTION OF THE PREFERRED EMBODIMENTS

Figure 5:
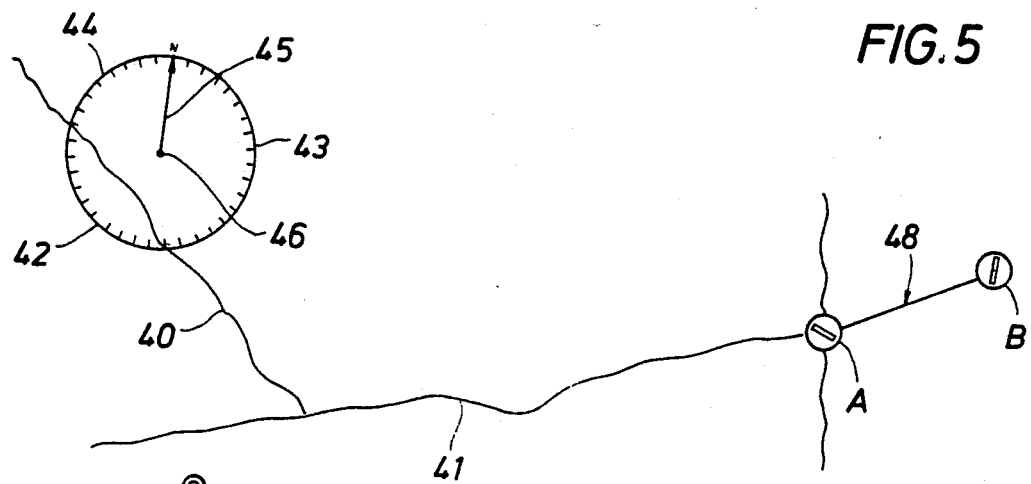
FIG. 5 is a plan view of a portion of a map or chart illustrating a magnetic compass rose thereon with a departure airport represented schematically at A and destination airport represented schematically at B.

One form of the device of the present invention will be described in detail in operation in connection with its use to determine a flight course relative to magnetic North to fly from a selected location or place of departure to a predetermined, or desired destination. However, such explanation is by way of example only and is not intended as a limitation, since the present invention may be used, again by way of example only, for relocating a marking, or indication such as a magnetic compass rose, magnetic North representation, road, geographical marking or any other marking, or representation on a chart, map and the like to a desired relocation on the chart, map and the like without changing the orientation of the relocated marking or indication relative to it original relationship to magnetic North on the map, chart and the like.

Attention is first directed to FIGS. 1 and 4 of the drawings wherein the invention is shown as including a first member referred to generally as 8, a second member 9 and a pair of parallelograms referred to generally at 11 and 13. The first parallelogram 11 includes the first pair of longitudinally extending links 11a, 11b which have inner ends 11c, 11d respectively, and outer ends 11e, 11g, respectively. The second, parallelogram 13 includes a second pair of longitudinally extending links 13a, 13b having inner ends 13c, 13d, respectively and outer ends 13e, 13g, respectively. Pivot connections 18, 19 of any suitable well known type adjacent the inner ends 11c, 11d of links 11a, 11b, respectively, pivotally connect the inner ends of links 11a, 11b, to the first member 8. Pivot connections 20, 21 adjacent the inner ends 13c, 13d of links 13a, 13b connect the inner ends of links 13a, 13b with the second member 9 with the second member 9, as shown in FIGS. 1 and 4.

Parallelograms 11 and 13 are connected together by the third link 25 having upper and lower ends 26, 27. Additional pivot connections 28, 29 adjacent the upper and lower ends 26, 27, respectively, of the third link connect with the outer ends 11e, 13e of links 11a, 13a and with the outer ends 11g, 13g of links 11b, 13b as shown in the drawings.

A first parallelogram may be considered as comprising link 11a, link 11b, third link 25 and the portion of member 8 between pivot connections 18, 19.

A second parallelogram may be considered as comprising link 13a, link 13b, third link 25 and the portion of member 9 between pivot connections 20, 21. The links 11a, 11b may be considered as a first pair of links and the links 13a, 13b may be considered as a second pair of links. The first and second parallelograms are equal in size. The length, or longitudinal extent of the first pair of links 11a, 11b from pivot connections 18,19 to the additional pivot connections 28,29 is equal to the length of said second pair of links from pivot connections 20,21 to the additional pivot connections 28,29 on the third link 25.

The length of the third link 25 between pivot connections 28,29 is equal to, or the same as, the distance between the pivot connections 18,19 on the first, or one, member 8 and also equal to, or the same as the distance between the pivot connections 20,21 on the second, or other, member 13.

In the preferred embodiment shown, the one member 8 and other member 9 are shown in semi-circular form providing semi-circular portions 31 and 32, each with semi-circular edge surfaces 34 and 35, respectively, and each with straight edge 36 and 37, respectively. An indentation 36a is provided at the middle of edge 36 for receiving projection 37a in the middle of edge 37 when the two edges are abutted as shown in FIG. 1 and these cooperate to define the center of the circular member C formed when the two semi-circular member abut along edges 36,37 as shown in the drawings.

Any suitable indicia may be placed on the members 8 and 9, depending upon the use of the device. FIG. 3 is a detail view of the portion designated at 3 in FIG. 1 and illustrates one form of indicia which may be used which comprises a radial indicia immediately adjacent the semicircular edge surfaces 34,35 of members 8 and 9. The markings are in degrees increasing clockwise around the circular member as illustrated in FIG. 1 formed by the two semi-circular portions from 0 degrees to 360 degrees in Arabic numerals. One marking, which may be termed a radial degree marking begins with a 0 degree marking adjacent the upper end of the edge 37 on the member 9 and continues clockwise around the semi-circular edge of member 9 and then continues around the semi-circular edge of member 8 from adjacent the lower end of edge 36 and continues around and adjacent semi-circular edge 34 on the member 8 through 360 degrees adjacent the upper end of edge 36 and adjacent the beginning 0 degree marking on member 9. These radial markings in degrees are accompanied by radial lines extending inwardly from the semicircular edge of each semi-circular portion which assist to distinguish the Arabic degree numerals from 0 degrees through 360 degrees and the degree increments between the Arabic degree markings.

Inner indicia also extend from zero to 360 degrees in Arabic numerals on the semi-circular portions 8 and 9, also in a clockwise direction beginning on member 8 adjacent the lower end of edge 36 and continuing upwardly around the semi-circular edge 34 of member 8 and then continuing over to member 9 and down around the semi-circular edge 35 of member 9 That is, the inner indicia 0 degree marking begins on the member 8 immediately adjacent the 180 degree radial marking which is the first of the radial degree markings that appears on member 8 adjacent the lower end of edge 36, which is the beginning number of the radial degree numbers on the member 8 and continues to the 360 degree radial marking at the upper end of the semi-circular surface on member 8. The inner indicia then continues on member 9, beginning adjacent the zero degree radial marking, and continues from the upper end of the upper edge 37 on semi-circular member down adjacent semi-circular edge 35 to the lower end of edge 37 completing the inner indicia 0 to 360 degree marking.

This inner degree indicia is spaced inwardly relative to the radial degree markings which are nearer the semi-circular edges 35,34 of members 9 and 8. The inner degree indicia may be considered as the reciprocal of the adjacent and outwardly spaced radial degree markings extending clockwise from 0 to 360 degrees on the semi-circular portions as described previously. The foregoing radial degree marking is illustrated in FIG. 3 at 1; the inner markings in degrees are designated by the numeral 2 and the line markings for the radial degree marking is shown at 5 and for the inner degree marking at 6.

The third link 25 is provided with indicia in the form of an arrow and the letter N representing magnetic North.

Where the invention is employed in other situations, the configuration of the members 8 an 9 may be changed as desired to accomplish the function to be accomplished. In some instances the members may be quadrilateral, rectangular, or any other suitable shape.

The device may be formed of any suitable material and transparent plastic is the preferred material, although it could as easily be formed of metal or any other substance. In the preferred form, the components are flat to provide surfaces that readily pass, or slide over each other in use of the device, but the shape could vary without departing from the scope of the invention.

The use of the device will be explained in relation to determining a flight course for aircraft, but again such explanation is by way of example only, as the present invention may be used in many other applications. By way of example only, it may be employed to plot course over terrain and water by vehicles suitable for movement thereon, as well as relocating any thing on a map or chart.

For example, in FIG. 5 a chart or map is schematically shown on which the line 40 may represent any geographical condition such as a river, mountain range or any other geographical or other topography that may appear on a map or chart. The line 41 may represent, for example, a road, railroad or some other object that might appear on a map or chart. A magnetic compass rose is illustrated at 42 in FIG. 5 which includes radial marks 43 adjacent its circumferential edge 44 and an arrow 45 extending from the center 46 of the magnetic compass rose to its outer circumferential edge as shown in FIG. 5, which arrow represents the direction of magnetic North on the chart or map. Navigational maps indicate the date of their expiration and the representation of magnetic North may change with each new map.

The use of the present invention as a navigational aid, by way of example only and not as a limitation, with aircraft to plot a course in relation to magnetic North from a departure airport represented at A to a destination airport represented at B will be explained stepwise in one example by referring sequentially to FIGS. 5-10.

The magnetic compass rose 42 in this example is not located close enough to departure airport A on the chart or map in FIG. 5 so that the device of the invention can be merely placed on it and the course line 48 from A to B determined by moving one of the semi-circular members, as will be described hereinafter. Therefore, the relative position of magnetic North as shown on the magnetic compass rose 42 of the map or chart on FIG. 5 must be transposed to, or near enough to departure airport A to enable the course line to be easily and readily determined by the present invention.

The first step is to draw a line 48 from A to B, as shown in FIG. 5 representing the course line for the flight from departure location A to destination location B. All of the subsequent steps described will take place on the map or chart of FIG. 5, but for the sake of clarity, each step is shown and described with relation to a separate reproduction of FIG. 5.

Figure 6:
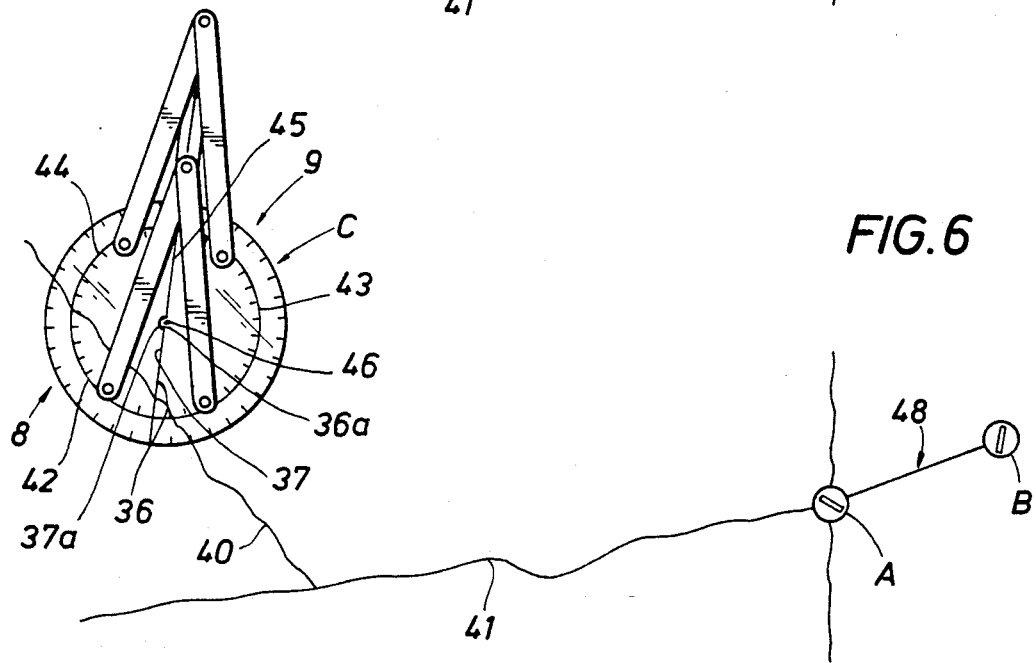
FIG. 6 is the map or chart of FIG. 5 with the device of the present positioned over the magnetic compass rose shown in FIG. 5.

The next step is shown in FIG. 6 where FIG. 5 is reproduced, except the device of the present invention is placed on the magnetic compass rose on the map or chart of FIG. 5, reproduced in FIG. 6 so that its center, when the semi-circular members 8 and 9 are abutted together as shown in FIG. 6, coincides with the center 46 of the magnetic compass rose and the edge 36 of member 8 coincides with the arrow 45 on the magnetic rose representing magnetic North.

This is accomplished in any suitable manner, such as by way of example only, by placing the device on the compass rose 42 in FIG.6 with edge 36 of member 8 in alignment with arrow 45 and with the dot 46 of the magnetic compass rose, which represents the center of the magnetic compass rose, in the center of the recess 36a in edge 36. Member 8 is retained in this position and member 9 is then manually moved toward edge 36 on member 8 to abutting relationship with edge 36 as shown in FIG. 6. This positions the projection 37a on edge 37, in recess 36a of edge 36 as shown in FIGS. 1 and 6 and over dot 46 of the magnetic compass rose to form the circular member C as shown in FIGS. 1 and 6. Since the device is preferably transparent and this is the initial step, the members 8 and 9 may be collapsed together and the device then positioned on the magnetic compass rose 42 on the map or chart and aligned with the center of the magnetic rose and the arrow indicating magnetic North as above explained.

Since the size of the device of the invention, in this example, is such that member 9 can not be moved away from member 8 a sufficient amount to align it with with departure airport A and obtain a course reading with the above described step, the device must be shifted in a manner to move or transpose the representation of magnetic North closer to, or on airport A marking.

Figure 7:
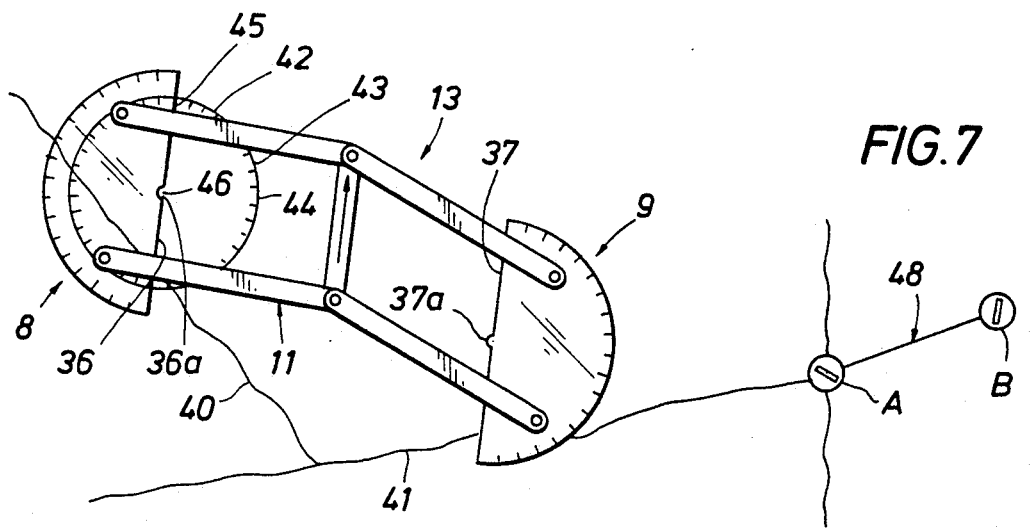
FIG. 7 is the chart of FIG. 5 showing the first movement of the device of the present invention to determine the magnetic compass reading for flying from departure airport A to destination airport B.

In the next step, represented in FIG. 7. member 8 is then retained manually in its position illustrated in FIG. 6 and the second member 9 is moved away from it as shown in FIG. 7. This expands the first and second parallelograms 11 and 13 while member 8 is manually retained in its position of FIG. 6 to maintain the edge 36 of the first member aligned with the arrow 45 in the compass rose 43 representing magnetic North. This also maintains the edge 37 aligned with the arrow 45 representing magnetic North since it is parallel to edge 36. Member 9 is still not close enough to airport A to obtain a reading for the course line 48 from A to B. The device is retained in its expanded position as shown in FIG. 7 by manually retaining member 9 retained in its position shown in FIG. 7, and member member 8 is then collapsed to abut member 9 to again form the circular member C shown in FIG. 8.

Figure 8:
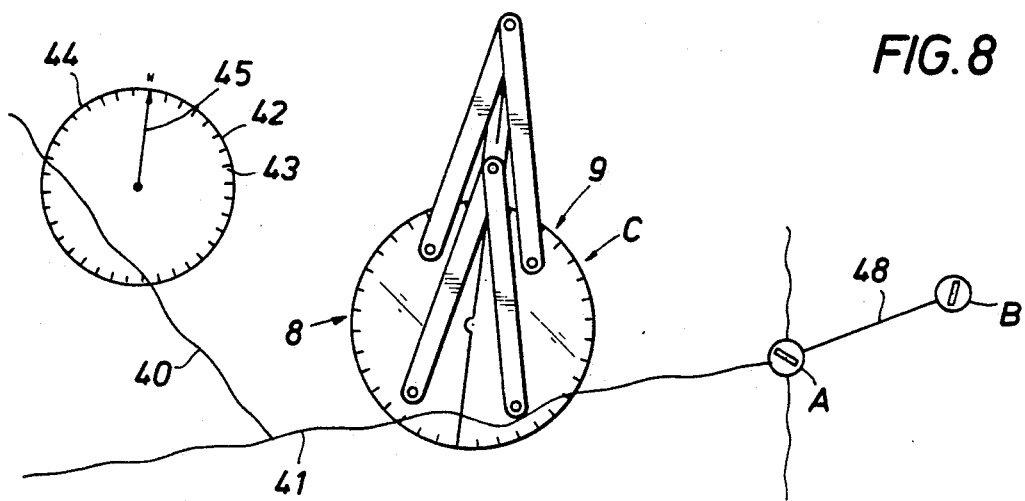
FIG. 8, is the chart of FIG. 5 showing the second movement of the device of the present invention to determine the magnetic compass reading for flying from departure airport A to destination airport B as the place of arrival.

The next step is to move one of the semi-circular members of circular member C of FIG. 8, or both in a manner as previously described, if necessary to obtain the desired course heading. The first member 8 is again retained and as shown in FIG. 9 it is only necessary to move the second member 9 away from member 8 to place the projection 37a in alignment with airport A so that member 9 overlays the course line 48 as shown in FIG. 9.

Figure 9:
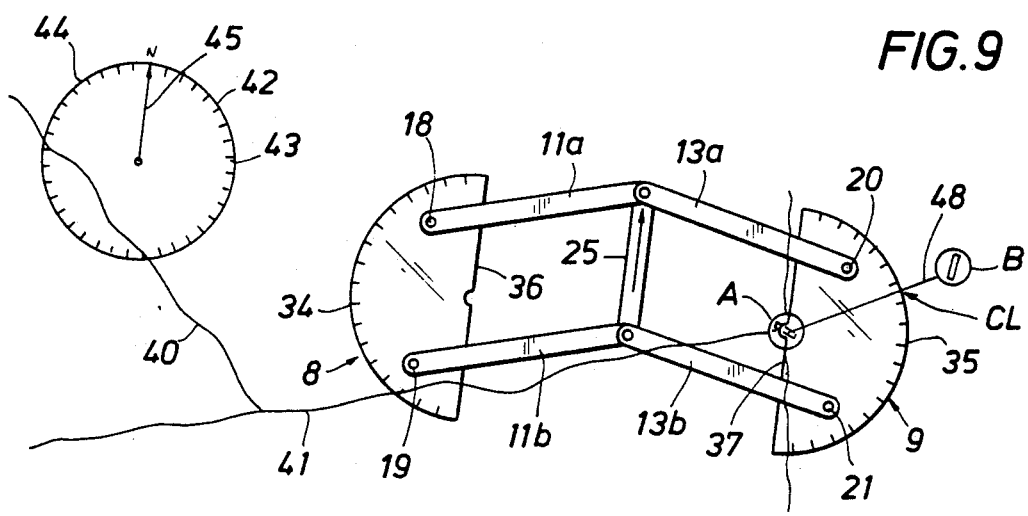
FIG. 9 is the chart of FIG. 5 showing the third movement of the device of the present invention which enables the present invention to indicate the magnetic compass reading for flying airport A to airport B.
Figure 10:
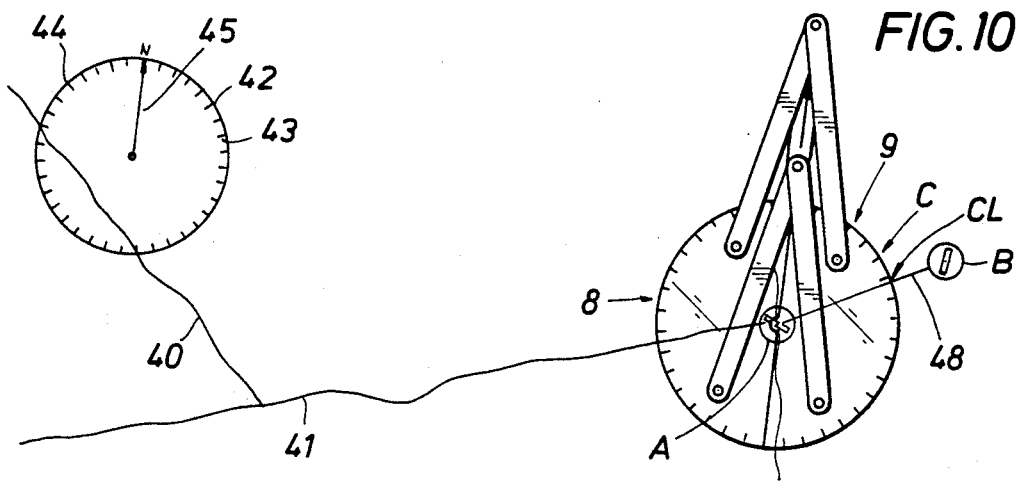
FIG. 10 is the chart of FIG. 5 showing movement of the device of the present invention to determine the magnetic compass reading for flying from airport A as the place of departure to any other airport on the map or chart, which destinations are not illustrated on map or chart 5.

The magnetic North heading for the course line 48 to fly from airport A to airport B may be readily determined by reading the radial degree marking on member 9, represented generally by CL in FIGS. 9 and 10, that coincides with or is nearest the course line 48 which is visible through the transparent member 9. The return flight course or magnetic North course heading to return from any destination, such as destination B, to the point of departure such as A, by way of example only, can also be visually determined when the original magnetic heading from origination, or departure, to destination is visually determined by reading the degree indicia on the inner marking on the device of the present invention.

If desired, member 9 may be retained while member 8 is moved to abutting relationship therewith in a manner as previously described so that the position of magnetic North as it appears on compass rose 42 on the chart or map of FIG. 5 is relocated to airport A, as shown in FIG. 10. This enables a course heading to any other desired destination shown on a map or chart from airport A to be obtained by repeating the procedure herein previously described.

Stepwise expanding and collapsing the first and second parallelograms while sequentially maintaining the edge 36 of the first member 8 and the edge 37 of member 9 aligned with the arrow representing magnetic North on a magnetic compass rose such as shown in FIG. 5 allows the members 8 and 9 to be stepwise moved away from each other and then collapsed toward each other to walk the device of the present invention to any location in the manner above described while maintaining an alignment with magnetic North as shown on the selected compass rose, regardless of its location on the map or chart. The double parallelogram arrangement of the present invention enables the edges 36, 37 of members 8 and 9 to maintain a parallel relationship while being moved so that the line on a compass rose 43 on a map or chart representing magnetic North can be moved rapidly and easily to any location on the map or chart. Also, the semi-circular members, along with the double parallelograms provides greater flexibility in operation of the invention so that the movement and placement of members 8 and 9 relative to each other as they are sequentially expanded or moved apart and then collapsed toward each other is substantially unrestricted. This enables the semi-circular members and the two pair of parallelograms to be moved and positioned any where on a map above, below or on an imaginary line between the map compass rose of FIG. 5 and airport A. In FIG. 7 the center of semi-circular member 9, represented by the projection 37a on edge 37 is below the imaginary line, but if desired, member 9 could be moved above the imaginary line and the expanded distance between member 8 and member 8 is only limited by the size of the parallelograms.

Where desired, or necessary, the parallelograms may be only partially collapsed or completely collapsed. Substantial movement on a chart or map can be accomplished by maintaining the one member in a desired aligned position and then moving the other member to at least partially expand or fully expand the dual parallelograms; thereafter the other member may be retained in position and the one member moved to at least partially collapse or fully collapse the dual parallelograms. The foregoing procedure is repeated until the desired movement is attained. The apparatus and method enables a magnetic course to and from a destination to be easily and readily determined and enables other markings, representations or designations on a map or chart to be readily moved or relocated.

It can be seen from the foregoing that an apparatus and method is provided for shifting or transposing any geographical or man made structure from one location to another on a map or chart without affecting or changing the original orientation of that which is shifted.

The foregoing is by way of example only, and changes can be made without departing from the scope of the invention which is more properly encompassed by the following claims.

What is claimed is:

1. A navigational aid for use with a char, map and the like including:
   a first semi-circular member having a semi-circular edge surface and a straight edge;
   a second semi-circular member having a semi-circular edge surface and a straight edge;
   a pair of first links;
   a pair of second links;
   said pair of first links each having an inner and an outer end;
   said pair of second links each having an inner and an outer end;
   a pivot connection connecting said inner end of each link of said first pair of links to said first semi-circular member;
   a pivot connection connecting said inner end of each link of said second pair of links to said second semi-circular member;
   a third link having indicia thereon representing magnetic North;
   said third link having an upper end and a lower end;
   an upper end pivot connection adjacent said upper end of said third link to pivotally connect said outer end of one of said links of each said first and second pair of links adjacent said upper end of said third link;
   a lower end pivot connection adjacent said lower end of said third link to pivotally connect said outer end of the other of said links of each said first and second pair of links adjacent said lower end of said third link;
   said one link of each said first and second pair of links having the same length from their said inner end pivot connections on said first and second semi-circular members, respectively, to said upper end pivot connection on said third link;
   said other link of each said first and second pair of links having the same length from their said inner end pivot connections on said first and second semi-circular members, respectively, to said lower end pivot connection on said third link;
   said third link having a length extending between said upper and lower end pivot connections thereon which is equal to the length of the distance between said inner end pivot connections of said first and second pair of links on said first and second semi-circular members, respectively;
   said first pair of links and said second pair of links being dimensioned such that said third link lies outside a circle formed by said semi-circular members when said straight edges abut; and
   Arabic numeral markings on said first and said second semi-circular members beginning with 0 degrees on one of said semi-circular members and continuing thereon through 360 degrees on the other of said semi-circular members.

2. The navigational aid of claim 1 wherein said Arabic numeral markings extend clockwise beginning with 0 degrees on said first semi-circular member and continuing thereon through 360 degrees on said second semi-circular member.

3. The navigational aid of claim 2 including Arabic numeral markings on said first and second semi-circular members which represent the reciprocal of the Arabic numeral markings of claim 2 from 0 through 360 degrees.

4. The navigational aid of claim 1 wherein said Arabic numeral markings extend clockwise beginning at 0 degrees on aid second semi-circular member and continue on said first semi-circular member through 360 degrees.

5. The navigational aid of claim 4 including Arabic numeral markings on each said first and second semi-circular members which represent the reciprocal of the markings of claim 4 from 0 through 360 degrees.

6. The navigational aid of claim 1 wherein said Arabic numeral markings are adjacent said curved edge of aid semi-circular members.

7. The navigational aid of claim 1 wherein said first and second semi-circular members include a flat surface to facilitate movement of said members along a chart, map and the like.

8. A navigational aid for use with a map, chart and the like having markings such as geographical, map, chart and the like having markings such as geographical, compass rose, magnetic North and the like to reproduce the relative position of the marking at another location on the map, chart an the like including:
   a first semi-circular and second semi-circular member with each said first and said second semi-circular member having a straight edge;
   a first parallelogram connected to said first semi-circular member;
   a second parallelogram connected to said second semi-circular member and to said first parallelogram by a link; said first and second parallelograms being dimensioned such that said link lies outside a circle formed by said semi-circular members when said straight edges abut;
   marking means on at least one of said parallelograms representing magnetic North for alignment with selected markings on the chart or map whereby the navigational aid then may be moved along the chart, map and the like by progressively collapsing at least in part and expanding at least in part the parallelograms to enable said straight edges on said first and second semi-circular members to abut when desired while maintaining the initial relationship of said first semi-circular and second semi-circular member to magnetic North to reproduce the relative relationship of the marking in another location on the map, chart and the like.

9. A method of plotting a course from a location to a desired destination on a map or chart which has at least one compass rose with a magnetic North indication by a device formed by two semi-circular members which are interconnected by a pair of parallelograms that are connected by a third link with marking representing magnetic North at the juncture of the two parallelograms, the two semi-circular members each having a straight edge and the two semi-circular members together having Arabic indicia representing 0 to 360 degrees, comprising the steps of:

placing a line on the map or chart from the place of origination to the desired destination;

aligning the center of the two semi-circular members of the device with the center of the compass rose on the map or chart;

aligning the straight edge of one of the semi-circular members with the representation of magnetic North on the map or chart;

retaining one of the semi-circular members in such alignment while moving the other semi-circular member to at least partially expand the two parallelograms and move the two semi-circular members apart;

moving said one semi-circular member that had been retained to at least partially collapse the two parallelograms and move the said one semi-circular member to abut the straight edges of the semi-circular members causing said third link to lie outside a circle formed by said semi-circular members; and repeating the procedure retaining said one member and moving said other member to another location and then moving said one member toward said other member until the distance from said one member to the desired destination on the map or chart is equal to or less than the distance between said one and said other member when the two parallelograms are in fully expanded relation whereby said one member may be moved to align with the desired destination to enable the course line from the place of origin to the desired destination to be visually observed and determined.

10. A method of assembling a navigational aid for sue with charts, maps and the like including the steps of:

forming a first semi-circular and second semi-circular member with each said first and said second semi-circular member having a straight edge;

forming a first and second pair of links of equal longitudinal extent and having inner and outer ends;

pivotally securing the first pair of links at their inner ends to the first semi-circular member;

pivotally securing the second pair of links at their inner ends to the second semi-circular member;

forming a third link of suitable longitudinal extent with upper and lower ends;

pivotally securing the third link adjacent its upper and lower end to the outer ends of the first pair of links to form a first parallelogram; and pivotally securing the third link adjacent its upper and lower end to the outer ends of the second pair of links to form a second parallelogram dimensioning the first pair of links and the second pair of links such that the the third link lies outside a circle formed by said semi-circular members when the straight edges abut.

* * * * *